United States Patent [19]

Weimersheimer

[11] Patent Number: 5,524,964
[45] Date of Patent: Jun. 11, 1996

[54] CHILD RESTRAINT CAR SEAT AND BED

[75] Inventor: Sam Weimersheimer, Brattleboro, Vt.

[73] Assignee: U.S. Magnet Corporation, Brattleboro, Vt.

[21] Appl. No.: 342,871

[22] Filed: Nov. 21, 1994

[51] Int. Cl.⁶ ............................................. B60N 2/26
[52] U.S. Cl. .................... 297/256.12; 297/256.1; 297/423.2; 297/354.13
[58] Field of Search ................ 297/256.12, 256.1, 297/250.1, 344.22, 344.21, 354.13, 354.12, 354.1, 362.12, 423.2, 423.19, 361.1

[56] References Cited

U.S. PATENT DOCUMENTS

| | | | |
|---|---|---|---|
| 2,625,987 | 1/1953 | Hunter | 297/250.1 X |
| 2,888,977 | 6/1959 | Thaden | 297/423.2 X |
| 3,239,271 | 3/1966 | Bergersen | 297/423.2 X |
| 4,518,139 | 5/1985 | Barfell | 297/344.22 X |
| 4,705,256 | 11/1987 | Hofrichter | 297/344.22 X |
| 4,762,364 | 8/1988 | Young | 297/256.12 |
| 5,183,312 | 2/1993 | Nania | 297/256.12 |
| 5,395,157 | 3/1995 | Rollo et al. | 297/344.22 X |

*Primary Examiner*—Milton Nelson, Jr.
*Attorney, Agent, or Firm*—Norman B. Rainer

[57] ABSTRACT

An automobile restraint seat for a child includes a seat section and a backrest pivotably joined to the rear of the seat section and rearwardly reclinable. A circular disc attached to the underside of the seat section rests atop a hollow base assembly. Detent bores are radially located about the disc. A locking pin attached to the base assembly enables the combined seat section and backrest to be secured in any position of rotation relative to the base assembly. A footrest is slidably deployable from the interior of the base assembly.

2 Claims, 2 Drawing Sheets

CHILD RESTRAINT CAR SEAT AND BED

BACKGROUND OF THE INVENTION

1. Field of the Invention

This invention relates to restraint devices useful for holding a person in a vehicle, and more particularly concerns a reclinable and rotatable child restraint car seat which can be adjusted to various configurations according to the needs and desires of the operator. The present invention is particularly, but not exclusively, useful for the protection of children during vehicular travel and for ease in placing them in and removing them from the vehicle.

2. Description of the Prior Art

Although vehicle safety has always been of general concern to motorists, we have recently seen increased attention being given to the safety concerns of the individual passenger. More specifically, both the enactment of seat belt laws and the conduct of information campaigns which encourage passengers to "buckle-up" are indicative of governmental attempts to arouse public awareness of the importance of passenger safety.

Of particular concern in this matter is the safety of children. Whereas restraint harnesses incorporated into the vehicle's structure are generally sufficient for the safety of older children and adults, infants pose several unique problems that are well known to anyone who has traveled with them.

Without specifically enumerating these problems, it is apparent that the infant's safety and comfort are of great importance. Additionally, it is desirable that the infant be conveniently accessible while being restrained and that the device or apparatus used to restrain the child be easily operable. Further, it is desirable that the child restraint device be versatile and adaptable. A particularly desirable feature is to enable the child to recline while secured. Most car seats can accommodate the reclining position only in a direction transverse to the direction of motion of the vehicle.

Devices have been proposed for transporting children in a vehicle with increased safety and convenience. For example, U.S. Pat. No. 3,404,917 to Smith discloses a bracket for mounting a baby seat on the seat of a vehicle. U.S. Pat. No. 4,205,677 which issued to Ettridge discloses structure for adjusting a child's car seat between slumbering and sitting positions. U.S. Pat. No. 4,113,306 to von Wimmersperg discloses a child's vehicular safety restraint seat which is convertible to a stroller.

While the aforementioned prior art discloses various devices which include reclineable seats and convertible strollers, there is no teaching which maximizes the potential configurations for a child restraint car seat while the seat is secured in a vehicle. U.S. Pat. 4,709,960 to Launes and U.S. Pat. No. 5,236,221 to Minami both disclose child safety restraint seats which have provision for being reclined between sitting upright and reclined positions. Each of these devices disclose a molded one piece seat which is simply rotated to provide a reclined position. Although the child's head and upper body are lowered with respect to the lower body, the child remains in a position bent at the waist and knees. The child may not be positioned in a truly prostrate manner with either seat. Furthermore, regardless of position, the Launes and Minami seats do not provide full support to the child's legs and feet. While reclined, the feet are left to dangle over the end of the seat.

Yet another child restraint safety seat is disclosed in U.S. Pat. No. 4,762,364 to Young. The Young seat recognizes that in addition to having a reclining capability, it is desirable to have the capability of positioning the child in the car in other than forward and rearward orientations. Specifically, the Young seat recognizes that it is often desirable and advantageous to orient the child lengthwise on the passenger seat of a vehicle while the child restraint seat is secured to the vehicle. The Young seat provides this capability while permitting the seat to be reclined to a slumbering position. However, the Young seat does not provide for leg support in the reclining position. The child's legs generally hang over the end of the seat, producing an imbalanced condition and uncomfortable body position.

It is accordingly an object of the present invention to provide a child restraint car seat with a reclinable back which can orient the reclined child transverse to the direction of motion of the vehicle.

It is another object of this invention to provide a car seat of the aforesaid nature which provides safety for the child regardless of the configuration of the device, i.e. whether it be in an upright or reclined configuration or positioned in a longitudinal or transverse orientation with respect to the direction of vehicle travel.

It is a further object of the present invention to provide a car seat of the aforesaid nature which provides outstretched leg and foot support for the child in order to enhance the comfort and safety of the ride, and provide balance to the seat.

It is yet another object of this invention to provide a car seat of the aforesaid nature which may be easily positioned with a varying degree of recline.

It is still another object of the present invention to provide a car seat of the aforesaid nature which is durable, simple to operate, and amenable to low cost manufacture.

These and other beneficial objects and advantages will be apparent from the following description.

SUMMARY OF THE INVENTION

The above and other beneficial objects and advantages are accomplished in accordance with the present invention by a child safety automobile restraint seat comprised of:

a) a seat section comprised of a seat panel having front and rear extremities and opposed side extremities having side panels upwardly emergent therefrom, b) a backrest comprised of a back panel having an upper border, opposed side borders, and a lower border pivotably associated with the rear extremity of said seat section, c) a substantially circular disk having a flat lower surface, an upper surface fixedly associated with said seat section, a center axis, a plurality of detent bores radially disposed about said axis, and an axially centered bore, d) a base assembly having an interior region bounded in part by top, bottom, and parallel side walls, an elongated opening communicating with said interior region, means for engaging an automobile seatbelt, and means for pivotally retaining said disk against said top wall, e) pivot lock means associated with said top wall and configured to releasibly engage said detent bores, f) adjustment means for establishing the angle of recline of said seat panel with respect to said backrest, g) a horizontal footrest panel housed within said base assembly and slidably deployable therefrom through said elongated opening, and h) child restraint straps positioned to maintain a child within said seat.

In a preferred embodiment, the seat section and backrest may have a padded cover which is removable for cleaning. The seat section, backrest, base, and footrest may be fabricated of thermoplastic resin by way of injection molding processes.

BRIEF DESCRIPTION OF THE DRAWING

For a fuller understanding of the nature and objects of the invention, reference should be had to the following detailed description taken in connection with the accompanying drawings forming a part of this specification and in which similar numerals of reference indicate corresponding parts in all the figures of the drawings.

DESCRIPTION OF THE PREFERRED EMBODIMENT

Figure 1:
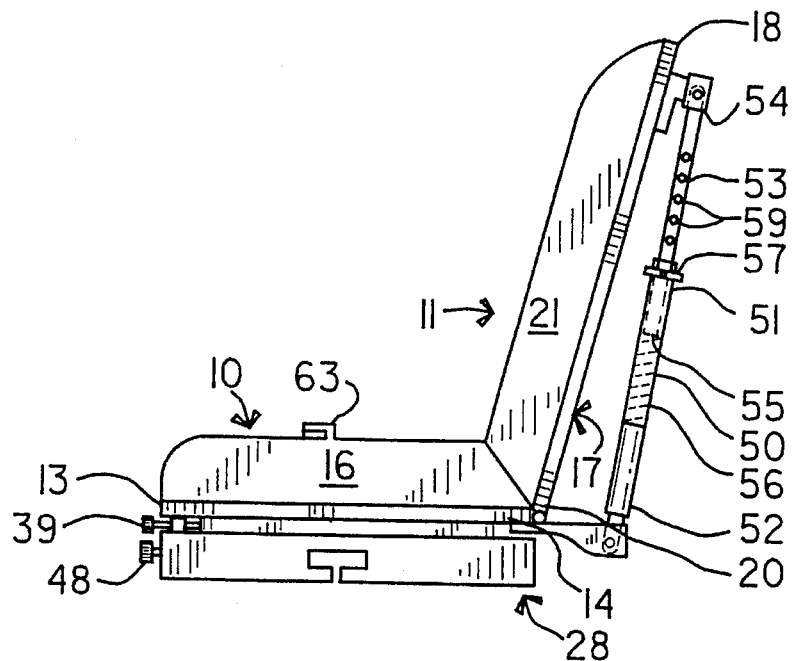
FIG. 1 is a side view of an embodiment of the device of the present invention, shown in its upright, seating position.

Referring to FIGS. 1–4, an embodiment of the device of the present invention is shown comprised of a seat section 10 and backrest 11 positioned above base assembly 28.

Said seat section is comprised of substantially rectangular seat panel 12 having front and rear extremities 13 and 14, respectfully, and opposed parallel side extremities 15. Side panels 16 are upwardly emergent from said side extremities. Interactive restraint straps 61 are associated with said side panels by way of attachment to paired brackets 63.

Backrest 11 is comprised of back panel 17 having upper and side borders 18 and 19, respectively, and lower border 20 pivotably associated by way of hinge 62 with rear extremity 14 of said seat portion. Lateral panels 21 are forwardly emergent from side borders 19.

A monolithic circular disc 22 bounded by flat upper and lower surfaces 23 and 24, respectively, and sidewall 25 of circular cylindric contour, is fixedly attached at said upper surface of the underside of seat panel 12. Four detent bores 26 radially oriented with respect to the center axis of the disc intrude into the disc from sidewall 25 at 90 degree locations about said disc. A central axial bore 27 is disposed in the disc in communication with lower surface 24 and orthogonal thereto. The disc preferably has a thickness between about ½" and ¾", said thickness being the height of sidewall 25.

A substantially flat rectangular base assembly 28 is disposed below seat panel 12, said base having an interior region bounded in part by top and bottom walls 29 and 30, respectively, and opposed parallel side walls 31. Said side walls are provided with facing grooves 32 elongated in parallel disposition to said top and bottom walls. A horizontally elongated opening 33 is disposed at the front border of base assembly 28 in communication with said interior region.

A pivot post 34 extends upwardly from top wall 29 through axial bore 27 of said disc, thereby retaining seat section 10 against top wall 24 for rotation with respect to base assembly 28. Securing means in the form of channel 36 disposed within bottom wall 30 and penetrating side walls 31 permits penetration of an automobile seat belt.

A locking shaft 37 is slideably secured by mounting collars 41 above top wall 29 of said base assembly in a manner permitting reciprocal movement of said shaft toward and away from disc 22. Said shaft has a distal extremity 38 adapted to penetrate a selected detent bore 26, and a proximal extremity equipped with knob 39 adapted to be manipulated by the operator. A coil spring 40 is positioned upon shaft 37 between said collars. The innermost extremity 65 of spring 40 is attached to said shaft, causing the shaft to be urged toward said detent bores.

A footrest panel 42 housed within the interior region of base assembly 28 has side edges 66 which slideably engage grooves 32, thereby enabling said footrest panel to slide partially outward through opening 33. An upraised shoulder 43 limits the extent of forward sliding movement of said footrest panel. A control rod 44 is rotatively secured by harness brackets 60 to the underside of panel 42 along the centerline thereof. Rod 44 serves to anchor the position of said footrest panel in either its stored, or forwardly extended positions. This is achieved by way of an angled distal tip 45 on rod 44 adapted to engage either forward or rearward notches 46 and 47, respectively, in bottom wall 30. Rotation of rod 44 by virtue of control knob 48 causes tip 45 to enter either of said notches and thereby secure the position of the footrest panel. A torsion spring may be coiled about rod 44 and interactive between said rod and base assembly 28 to apply axial rotational force to rod 44 to keep tip 45 lodged in notch 46 or 47.

Figure 2:
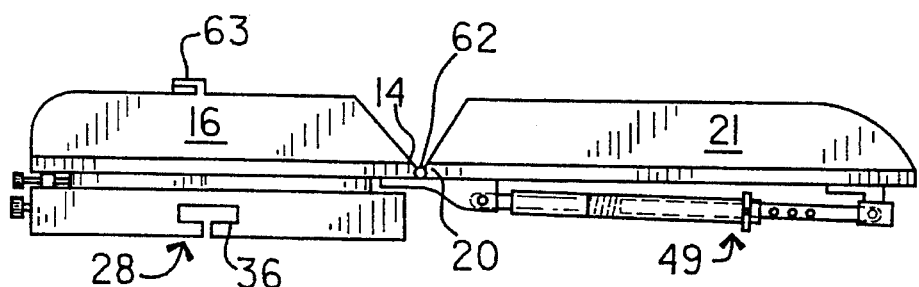
FIG. 2 is a side view of the embodiment of FIG. 1, shown in its lowered, reclining position.
Figure 3:
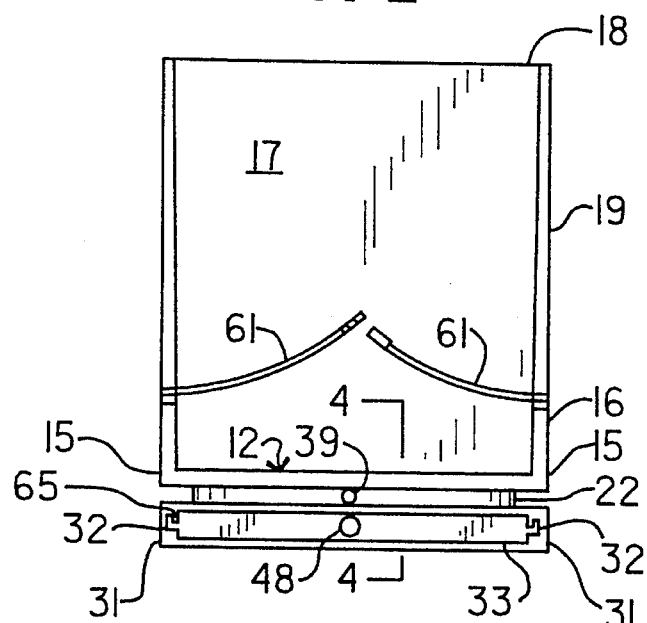
FIG. 3 is a front view of the embodiment of FIG. 1.
Figure 4:
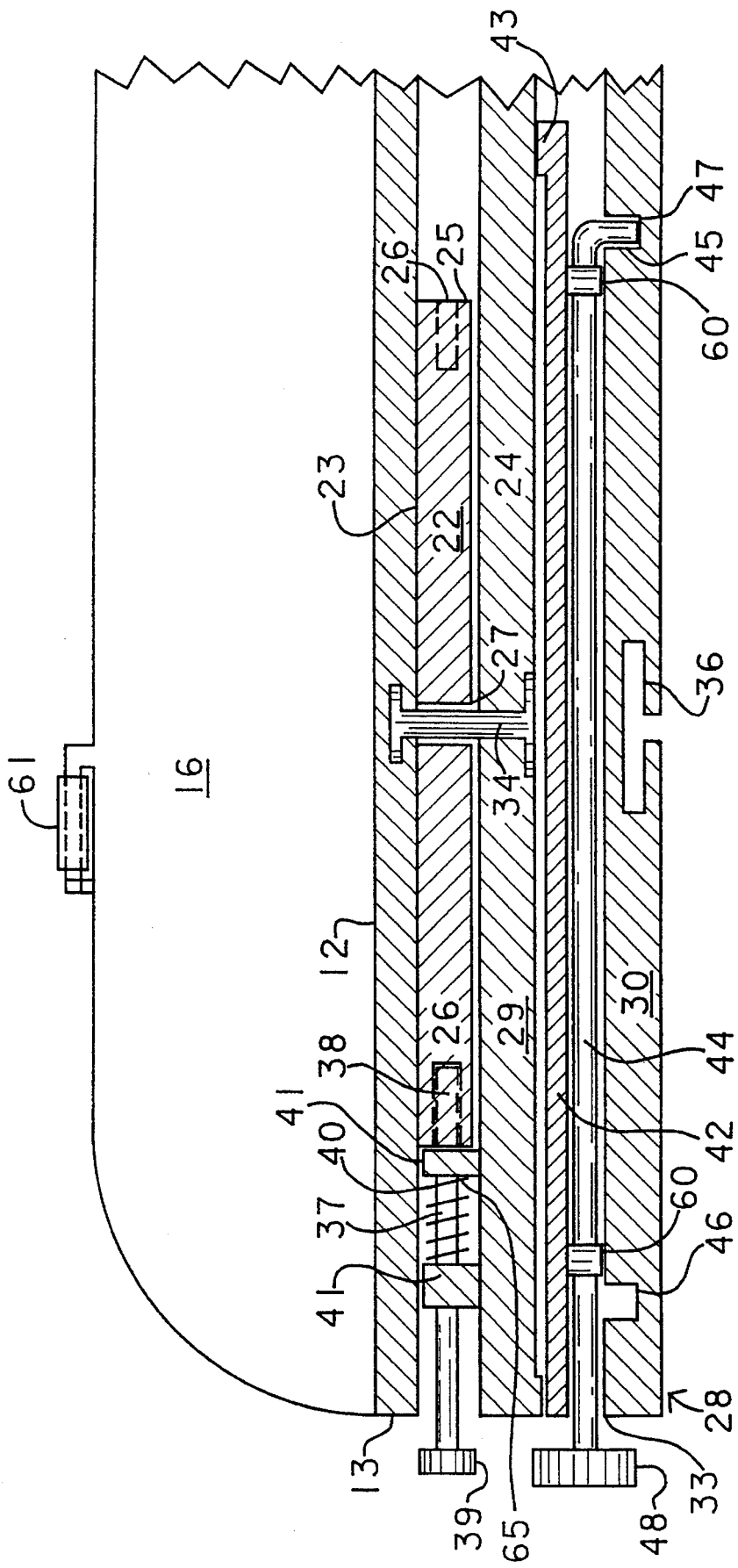
FIG. 4 is an enlarged sectional view taken in the direction of the arrows upon the line 4—4 of FIG. 3.

Backrest adjustment means 49 positioned behind backrest 11 utilizes cylinder 50 elongated between an upper extremity 51 and lower extremity 52 pivotally associated with the rear extremity of seat panel 12. A piston 53 having upper and lower extremities 54 and 55, respectively, and a series of apertures 59 is adapted to freely reciprocate within said cylinder. Upper extremity 54 is pivotally associated with the upper border of backrest 11. A compression spring 56 located within said cylinder urges said piston upward. Locking means, in the form of cotter pin 57 penetrates the cylinder and piston so as to stabilize the effective length of the cylinder/piston combination. When said length is its shortest, the backrest is in the reclining position as shown in FIG. 2. When the cylinder/piston combination is at its largest length, the backrest is in its upright, sitting position, as shown in FIG. 1.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A child's automobile restraint seat comprised of:

a) a seat section comprised of a seat panel having front and rear extremities and opposed side extremities having side panels upwardly emergent therefrom, b) a backrest comprised of a back panel having an upper border, opposed side borders, and a lower border pivotably associated with the rear extremity of said seat section, c) a substantially circular disk having a flat lower surface, an upper surface fixedly associated with said seat section, a center axis, a plurality of detent bores radially disposed about said axis, and an axially centered bore, d) a base assembly having an interior region bounded in part by top, bottom, and parallel side walls, an elongated opening located below the front extremity of said seat section and communicating with said interior region, means for engaging an automobile seatbelt, and means for pivotally retaining said disk against said top wall, e) locking means associated with said top wall and configured to releasibly engage said detent bores, f) adjustment means for establishing an angle of recline of said seat panel with respect to said backrest, g) a horizontal footrest panel housed within said base assembly and slidably deployable therefrom forwardly through said elongated opening, h) a control rod rotatively secured to the underside of said footrest panel, and i) restraint straps positioned to maintain a child within said seat.

2. The restraint seat of claim 1 wherein said control rod has an angled distal tip adapted to secure the position of the footrest panel upon sliding movement within said base assembly.

* * * * *